(12) United States Patent
Maniglia et al.

(10) Patent No.: US 10,863,584 B2
(45) Date of Patent: Dec. 8, 2020

(54) SMALL CELL MOBILE SIGNAL AGGROGATOR

(71) Applicant: Evolution RF, LLC, Manchester, NH (US)

(72) Inventors: Steven P Maniglia, Merrimack, NH (US); Hocine Djennas, Concord, NH (US); Scott Goodrich, Hancock, NH (US)

(73) Assignee: Evolution RF, LLC, Manchester, NH (US)

( * ) Notice: Subject to any disclaimer, the term of this patent is extended or adjusted under 35 U.S.C. 154(b) by 0 days.

(21) Appl. No.: 16/357,861

(22) Filed: Mar. 19, 2019

(65) Prior Publication Data

US 2019/0289671 A1    Sep. 19, 2019

Related U.S. Application Data

(60) Provisional application No. 62/644,819, filed on Mar. 19, 2018.

(51) Int. Cl.
*H04W 88/10* (2009.01)
*H04W 36/14* (2009.01)
*H04W 92/02* (2009.01)

(52) U.S. Cl.
CPC ........... *H04W 88/10* (2013.01); *H04W 36/14* (2013.01); *H04W 92/02* (2013.01)

(58) Field of Classification Search
CPC .......... H04B 1/0057; H04B 1/18; H04B 1/38; H04W 36/14; H04W 88/10; H04W 92/02
See application file for complete search history.

(56) References Cited

U.S. PATENT DOCUMENTS

| | | | |
|---|---|---|---|
| 8,254,368 B2* | 8/2012 | Huber | G06Q 20/102 370/350 |
| 2009/0285135 A1* | 11/2009 | Rousu | H04B 1/0057 370/297 |
| 2018/0124834 A1* | 5/2018 | Salem | H04W 74/0808 |
| 2018/0220301 A1* | 8/2018 | Gallagher | H04W 12/0609 |

* cited by examiner

*Primary Examiner* — Saad A. Waqas
(74) *Attorney, Agent, or Firm* — Bourque & Associates

(57) ABSTRACT

A mobile signal small cell aggregator system allows mobile signals from multiple network operators to be combined and split from the system. The system receives input from multiple ports from one or more network operators and operator bands and transfers the signals to a downlink/summing or aggregation unit which sends the signals to connected antennas to be received by users of the particular network operator. Signals received from connected antennas from users of one or more network operators are aggregated and switched to the appropriate small cell port and forwarded to the selected network operator. The system is configured to provide network control, power monitoring and attenuation, and a single GPS input for use by all of the connected network operators.

3 Claims, 3 Drawing Sheets

SMALL CELL MOBILE SIGNAL AGGROGATOR

CROSS REFERENCE TO RELATED APPLICATION

This application claims priority to U.S. Patent Application No. 62/644,819 filed on Mar. 19, 2018 entitled "SMALL CELL MOBILE SIGNAL AGGROGATOR", which is incorporated fully herein by reference.

TECHNICAL FIELD

The present invention relates to mobile data and telephone technology and more particularly, relates to an aggregator system for deploying small cell mobile technology for multi-operator and neutral host small cells supporting mobile data and telephone technology.

BACKGROUND INFORMATION

Work has already begun identifying key requirements for fifth generation mobile technology (5G) that is scheduled to be deployed around the end of the decade. This new technology will not only have to operate in an environment that continues to see exponential growth and data traffic, but will also see an increasing percentage of that traffic consumed from indoor locations. This exponential growth and data traffic is also an issue with currently deployed mobile technology. In most indoor environments, multiple users will be accessing services from multiple mobile network operators. An enterprise, such as a building owner or $3^{rd}$ party contracted to deploy and ensure carrier grade mobile data and wireless telephone service within a building or structure, may have a contract with a particular network operator but they will still require multi-operator networks to support those users wishing to connect to their own various network from within the building or structure.

Mobile device users are moving from smaller data packet information (pictures, email, web browsing, etc.) to mediums that require larger data packets (such as video, gaming and live streaming). This requires networks with fast handovers and data uplinks/downlinks (ULs/DLs) from tower to tower, whether small or large. Small cell deployment promises to offer an efficient and inexpensive solution—and the foundation toward building the future 5G network.

"Small cell" is an overarching term for low-powered radio access nodes that help provide service to both indoor and outdoor areas. Small cells can be used to provide in-building and outdoor wireless service. Mobile operators use them to extend their service coverage and/or increase network capacity. A small cell is basically a miniature base station that breaks up a cell site into much smaller pieces, and can comprise of a combination of indoor/outdoor systems. With a macro or large base station designed to reach a very large area, there's one pipe going into the network; with small cells, it breaks the one large network pipe into many smaller pipes. The main goal of small cells is to provide coverage over a larger area albeit at a low power level, increase capacity, speed and overall network efficiency.

Small cells are typically used in very densely populated urban areas, such as office buildings, shopping centers, sports venues, airports and train stations—basically any place you have the potential for a large number of people using/wanting to use data at a given point in time. Most small cell infrastructure deployments today have been targeted for outdoor use however, indoor small cell deployment is rapidly increasing and is of great interest to many mobile network providers.

Small cells provide a small radio footprint, which can range from 10 meters within urban and in-building locations to 2 km for a rural location.

One problem becoming apparent with small cell in-building deployment is that with typical large mobile signal deployment layouts, each carrier has its own equipment including base stations and transmitting and receiving antennas. In an outdoor large-scale deployment this is acceptable. In a contained building and indoor deployment setting, however, providing the physical space to accommodate each network carrier's equipment is prohibitive and in many instances perhaps impossible. Given the current state of the art, multiple mobile network operator bands cannot be multiplexed into a single antenna system without use of a more expensive distributed antenna system (DAS). Moreover, the problem of signal loss and cross-signal effects makes such an approach technologically inferior.

Accordingly, what is needed is a system and method for providing a viable, low cost, neutral hosted small cell deployment which aggregates (splits and combines) multiple small cells from the same or multiple Mobile Network Operators (MNO's) to and from single or multiple antenna zones and a single installation of other necessary equipment (such as a GPS antenna).

SUMMARY OF THE INVENTION

The present invention allows multiplexing of a number of cellular bands to a zone of antennas; wall or rack mount with small mechanical footprint to minimize wall or rack space; and normalization of different small cell power levels to balance power sent to each antenna zone. The invention also monitors small cell output power and alarms (via User Interface) if below a user settable threshold. The modular design of the invention allows for scaling from small venue to larger venue; low power output to high power output modules; remote monitoring and control; overcome cable loss and lower noise figure in the UL; built in DL and UL spectrum analyzer to monitor signal quality and noise floor levels; optional N×M switch; can be used passively (limited feature set) or actively (full featured); intuitive user interface (UI) that allows user to control output power levels and monitor health of multiple small cells from a single IP address.

The present invention features a mobile signal small cell aggregator system, configured for allowing mobile signals received from multiple mobile network operators to be combined and split from the system. The system comprises a plurality of small cells, each of the plurality of small cells configured for receiving mobile signals from and transmitting mobile network signals to a specified mobile network operator over a predetermined frequency band. Each of the plurality of small cells includes one or more ports, configured for receiving mobile signals from one or more mobile network operators over one or more mobile network operator signal bands, and for providing a plurality of mobile signals.

At least one downlink summing and aggregation unit is provided and configured for receiving the plurality of mobile signals from the plurality of ports, and for providing a plurality of aggregated mobile signals to a plurality of coupled antennas.

The plurality of coupled antennas are further configured for transmitting the aggregated mobile signals to one or more users of at least one of the mobile network operators, and for receiving mobile signals from the one or more users of at least one of the mobile network operators, and for providing the received mobile signals from the one or more users of at least one of the mobile network operators to at least one downlink/uplink summing and aggregation unit.

The at least one downlink/uplink summing and aggregation unit is configured for receiving the mobile signals from the one or more users of at least one of the mobile network operators, and for aggregating the mobile signals received from the one or more users, and for switching the received and aggregated mobile signals from the one or more users to a selected one of the plurality of small cells associated with a selected mobile network operator.

In a further embodiment, the system further includes a single GPS input for use by all of the connected mobile network operators. The single GPS unit is configured for receiving a GPS input signal and for splitting the received GPS input signal into 8 GPS output signals, each GPS signal for use by one mobile network operator.

In yet another embodiment, the system further provides at least one of network control, power monitoring and attenuation/amplification to the mobile signals.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
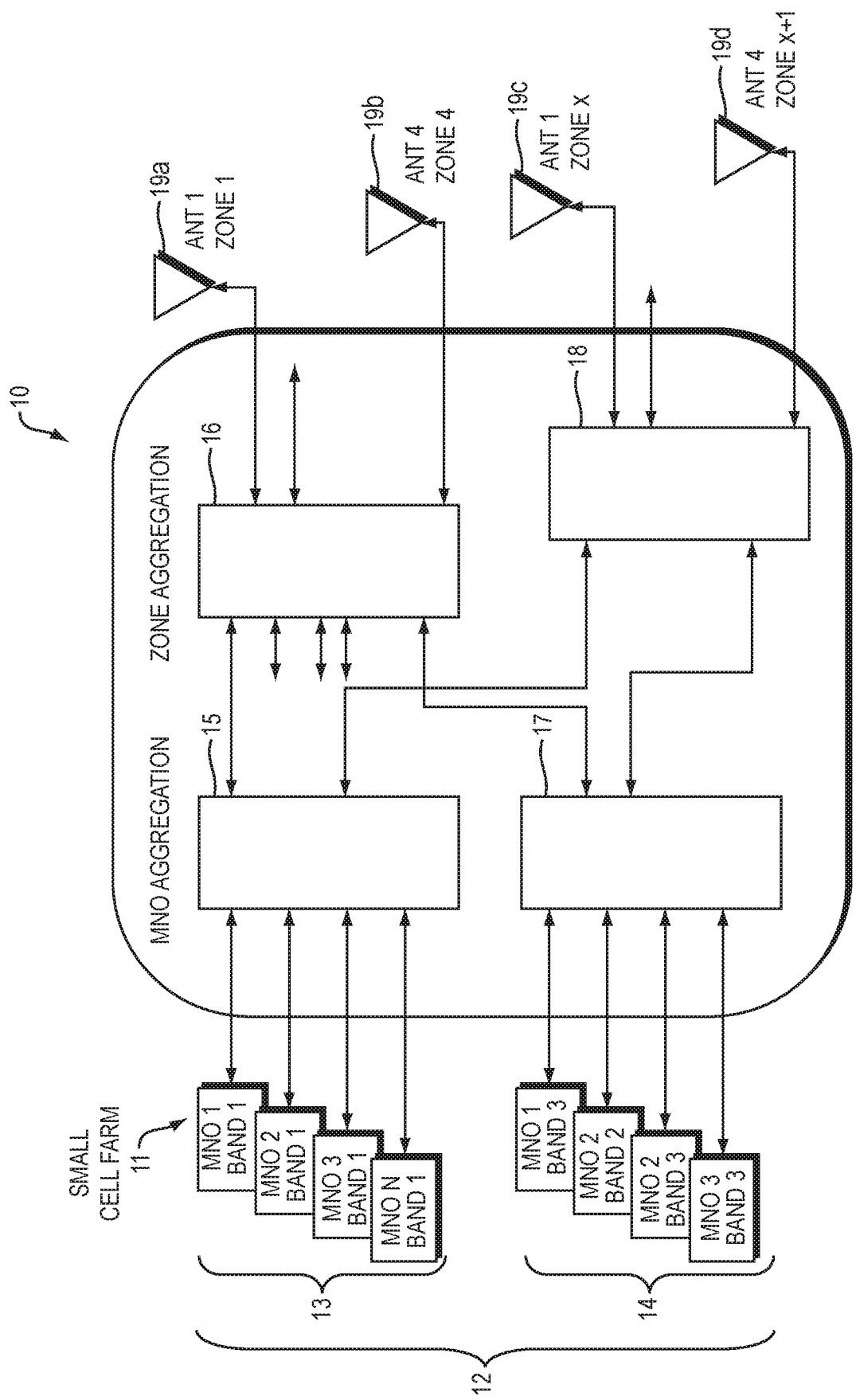
FIG. 1 is block diagram of multiple small cell aggregators shown cascaded in a multiple zone configuration according to one aspect of the present invention.

A small cell aggregator 10, FIG. 1, according to the present invention, includes but is not limited to the following features, functions and structure including an input output section 11 comprising a plurality of small cells 12 which may take the form of 4 Multiple Input Multiple output (MIMO) small cells, each MIMO cell having 2 ports for a total of 8 ports, or 8 Single Input single Output (SISO) small cells each SISO having one duplexed ports again for a total of 8 ports, or a combination of MIMO and SISO small cells totaling 8 ports. A larger number of ports may be accommodated by scaling the disclosed invention.

Each Mobile Network Operator (MNO) may transmit and receive data on one or more "bands" or frequencies. Accordingly, as currently described but without being a physical limitation of the present invention, the disclosed design can accommodate up to 8 unique frequency bands.

One feature of the present invention is that signals from multiple small cells 12 (in this example 4 duplexed ports from the same or different mobile network operators transmitting over the same or different bands) are aggregated by each aggregator 15 and 17. Four different mobile network operator signals (MNO-1 to MNO-4) are shown in connection with small cells 13 while 3 different mobile network operator signals MNO-1 through MNO-3 on several bands are shown in connection with small cells 14. The system according to the present invention can support multiple network operator's (MNO's) as well as multiple bands of multiple network operators. Downlink (DL) input power is typically in the range of 0 to 43 dBm. Two 4 way combiner/splitter duplex ports 16/18 are provided which provide signal to 4 or more antennas 19.

Figure 2:
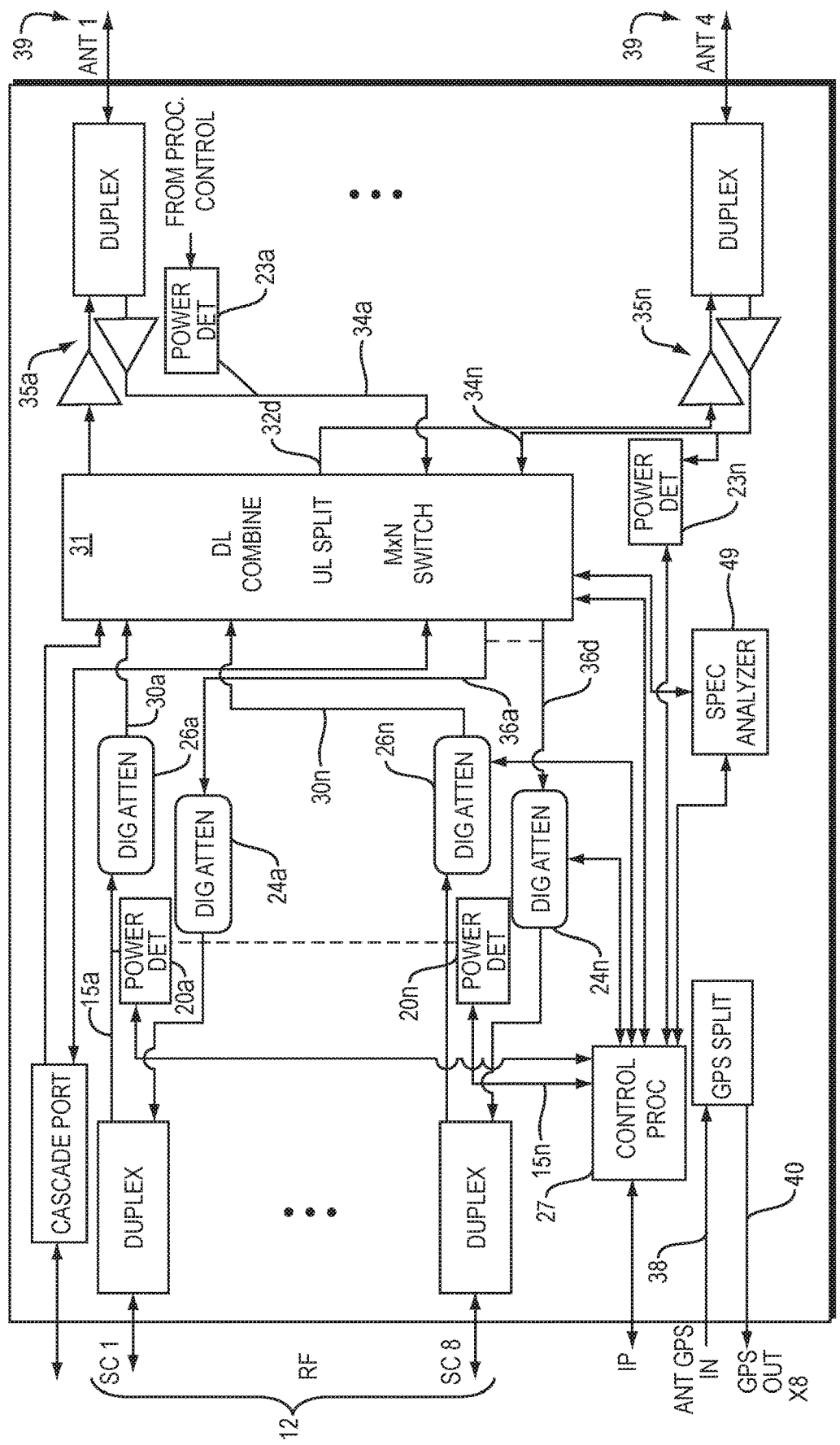
FIG. 2 is a more detailed block diagram of a single aggregator illustrating 8 duplex signal paths and downlink (DL) and uplink (UL) combiner/splitters as well as other elements which form part of the small cell aggregator according to the present invention.
Figure 3:
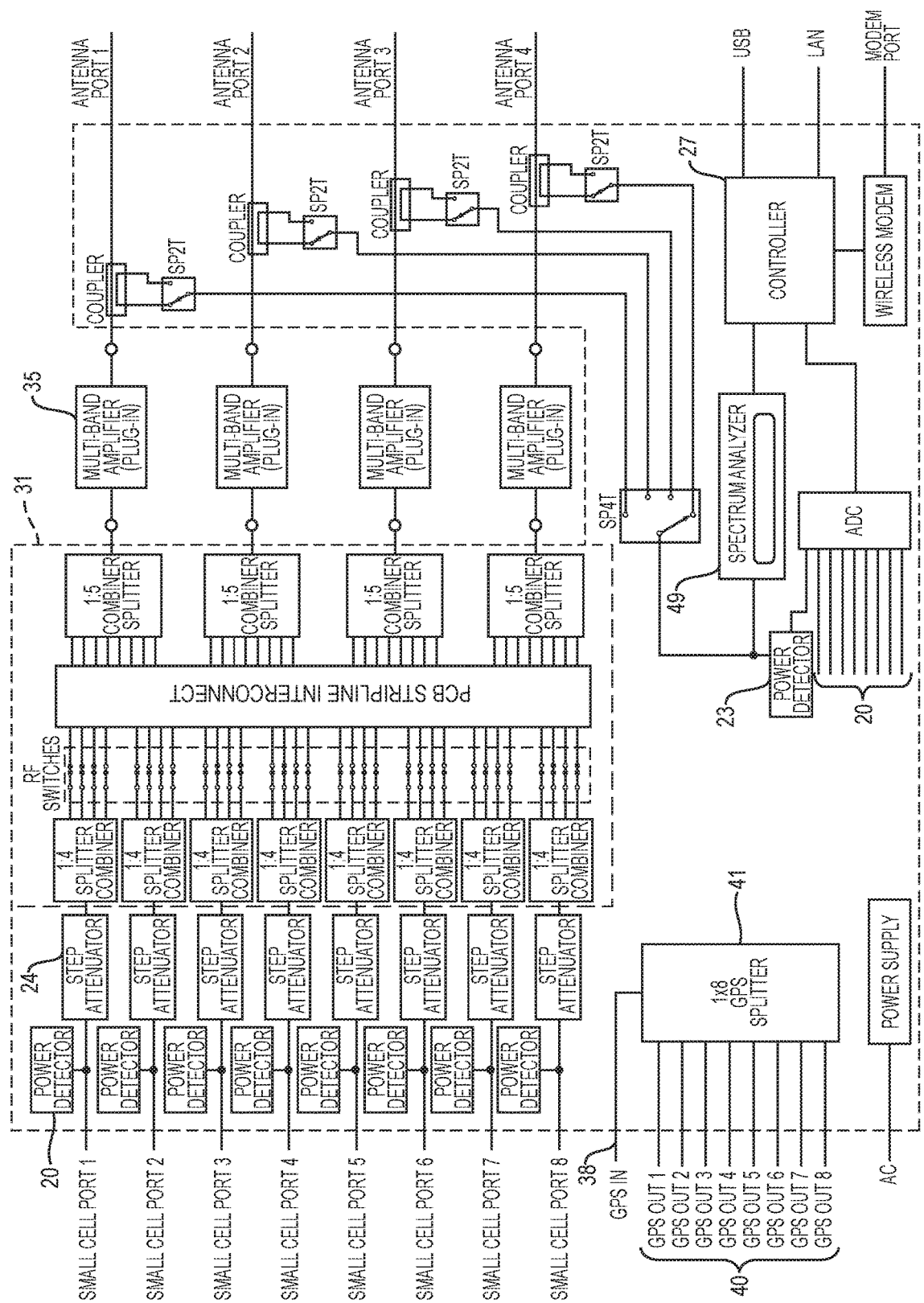
FIG. 3 is a yet more detailed functional block diagram of the system illustrated in FIGS. 1 and 2 according to the present invention.

A more detailed description of the system according to the present invention is shown in FIG. 2 and includes power detectors 20a-20n, FIG. 2 on each downlink input 15 which power detectors provide gross power detection, power adjustment/attenuation and an alarm if power below user defined threshold. Power detectors 23a-23n located on the uplink inputs 34a-34n provide gross power detection, power adjustment/attenuation and an alarm if power below user defined threshold. All power detectors 22, 23 preferably have an accuracy of + or −0.1 dB. All power detectors are under control and monitoring of the control processor 27 and may provide for optional RSSI plotting.

Downlink link gain/attenuation 26a-26n are programmable from +0 dB to 60 dB (Range needs to account for normalizing power levels across multiple SC types for power sharing normalization). The gain is set to overcome noise figure and cable losses.

Upload Link (UL) Gain/Attenuators 24a-24n are also programmable from 0 dB to 60 dB (a range to overcome Noise figure and cable loss).

For signal combining/splitting, up to 8 downlinks from either 8 SISO's or 4 MINO's or a combination of the two for a total of 8 downlink inputs 30a-30n are combined in downlink combiner 31 to provide 4 output signals 32a-32d to 4 or more antennas 39a-39n.

The switch which is part of element 31 (any to any switch) which is optional, allows for remote antenna configuration so that each MNO's signals can be added or removed from a zone covered by a particular antenna without a site visit.

One single GPS antenna in signal 38 feeds a GPS signal splitter 41 for providing 8 GPS signal outputs 40, one for each small cell 12.

The present invention features the ability to cascade input and/or outputs to cascade one unit to another for configurations greater than 4 MIMO I/O's or 8 SISO I/O's.

Amplifiers 35a-35n serve to amplify incoming (Downlink) and outgoing (upload link) signals, as needed.

Processor and process controller 27 provides the necessary hardware and software giving the user and the system the ability to remotely or locally control and monitor the unit 10; to monitor Downlink and uplink signals utilizing spectrum analyzer 39; provide the potential for USB and/or E-Net connections; provide for appropriate and adequate memory; provide minimal GUI capability; SNMP traps and secure HTTPS login.

Accordingly, the present invention provides a mobile signal small cell aggregator system which allows mobile signals from multiple network operators to be combined and split from the system. The mobile signal small cell aggregator system receives input from multiple ports from one or more network operators and operator bands and transfers the signals to a downlink/summing or aggregation unit which sends the signals to connected antennas to be received by users of the particular network operator. Signals received from connected antennas from users of one or more network operators are aggregated and switched to the appropriate small cell port and forwarded to the selected network operator. The system is configured to provide network control, power monitoring and attenuation, and a single GPS input for use by all of the connected network operators Modifications and substitutions by one of ordinary skill in the art are considered to be within the scope of the present invention, which is not to be limited except by the allowed claims and their legal equivalent.

What is claimed is:

1. A small cell mobile network signal aggregator system, configured for allowing mobile network signals received from multiple mobile network operators associated with a plurality of small cells coupled to said system to be combined and split from the system and transmitted to and received from a plurality of coupled antennas, the system comprising:

a plurality of small cells, each of said plurality of small cells configured for receiving mobile network signals from and transmitting mobile network signals to a specified mobile network operator (MNO) associated with one or more of said plurality of small cells over a predetermined frequency band, each of said plurality of small cells including one or more ports, each of said one or more ports of each of said plurality of small cells configured for receiving mobile network signals from said specified mobile network operator associated with said one or more of said plurality of small cells over one or more mobile network operator (MNO) signal bands, and for providing a plurality of mobile network signals to said specified mobile network operator associated with said one or more of said plurality of small cells over said one or more mobile network operator signal bands;

at least one downlink/uplink summing and aggregation unit, configured for receiving the plurality of mobile network signals from each of said one or more ports of each of the plurality of small cells from said multiple mobile network operators, and for providing a plurality of aggregated mobile network signals to a plurality of coupled antennas, wherein said at least one downlink/uplink summing and aggregation unit includes a remotely controllable switch, said remotely controllable switch configured for remotely configuring said plurality of coupled antennas such that mobile network signals of each MNO from among said multiple mobile network operators be added or removed from a zone covered by a particular antenna among the plurality of coupled antennas;

said plurality of coupled antennas responsive to said remotely controllable switch and configured for transmitting said plurality of aggregated mobile network signals to one or more users of at least one of said multiple mobile network operators, and wherein said plurality of coupled antennas are also configured for receiving mobile network signals from said one or more users of at least one of said multiple mobile network operators, and for providing said received mobile network signals from said one or more users of at least one of said multiple mobile network operators to said at least one downlink/uplink summing and aggregation unit, and wherein said at least one downlink/uplink summing and aggregation unit is configured for receiving, from said plurality of coupled antennas, said mobile network signals received from said one or more users of at least one of said multiple mobile network operators, and for aggregating said mobile network signals received from said one or more users, and for switching said received and aggregated mobile signals from said one or more users to a selected one of said plurality of small cells associated with a selected mobile network operator associated with said mobile network signals received from said one or more users of at least one of said multiple mobile network operators.

2. The system of claim 1, further including a single GPS unit for use by said multiple mobile network operators, said single GPS unit configured for receiving a GPS input signal and for splitting the received GPS input signal into 8 GPS output signals, each of said 8 GPS output signals for use by said predetermined, specified mobile network operator associated with said one or more of said plurality of small cells.

3. The system of claim 1, wherein said system further provides at least one of network control, power monitoring and attenuation/amplification to said mobile network signals.

* * * * *